(12) United States Patent
Takei et al.

(10) Patent No.: US 6,181,389 B1
(45) Date of Patent: *Jan. 30, 2001

(54) TFT LCD DEVICE WITH GATE/DATA LINES IN INTERRUPTING PATTERNS

(75) Inventors: Michiko Takei, Kanagawa; Tatsuya Ohori, Tokyo; Hongyong Zhang; Satomi Nagasawa, both of Kanagawa-Ken, all of (JP)

(73) Assignee: Semiconductor Energy Laboratory Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/842,469

(22) Filed: May 5, 1997

(30) Foreign Application Priority Data

May 8, 1996 (JP) ................................................ 8-139461

(51) Int. Cl.[7] ........................ G02F 1/1343; G02F 1/1333
(52) U.S. Cl. .................................. 349/44; 349/38; 349/39
(58) Field of Search ................................. 349/111, 110, 349/38, 42, 44; 257/59; 399/139

(56) References Cited

U.S. PATENT DOCUMENTS

| | | | | |
|---|---|---|---|---|
| 4,759,610 | * | 7/1988 | Yanigisawa | 349/111 |
| 5,032,883 | * | 7/1991 | Wakai et al. | 257/59 |
| 5,128,786 | * | 7/1992 | Yanagisawa | 349/110 |
| 5,459,595 | * | 10/1995 | Ishiguro et al. | 349/111 |
| 5,708,485 | * | 1/1998 | Kim | 349/38 |
| 5,781,262 | * | 7/1998 | Suzuki et al. | 349/111 |
| 5,796,448 | * | 8/1998 | Sato et al. | 349/42 |
| 5,995,182 | * | 11/1999 | Watanabe et al. | 349/111 |

* cited by examiner

Primary Examiner—William L. Sikes
Assistant Examiner—Toan Ton
(74) Attorney, Agent, or Firm—Fish & Richardson P.C.

(57) ABSTRACT

A number of parallel light-interrupting stripes are formed over the entire TFT substrate, and light-interrupting patterns that are isolated from each other are formed separately from the light-interrupting stripes. Light interruption along gate bus patterns is effected by the light-interrupting stripes, while light interruption along data bus patterns is effected by elongating branches from the gate bus patterns. Light interruption between the tip of each branch and a polysilicon drain is effected by the isolated light-interrupting pattern.

12 Claims, 11 Drawing Sheets

TFT LCD DEVICE WITH GATE/DATA LINES IN INTERRUPTING PATTERNS

BACKGROUND OF THE INVENTION

1. Field of the Invention

The present invention generally relates to a liquid crystal electro-optical (display) device, and particularly relates to a liquid crystal electro-optical (display) device in which light-interrupting patterns are provided on one of a pair of substrates constituting a liquid crystal panel on which substrate thin-film transistors (TFTs) are formed.

2. Description of the Related Art

The liquid crystal display device is widely used in a projection display apparatus and as a display device of a portable (or lap-top) information processing apparatus. Recently, attempts to use the liquid crystal display device as a high-resolution color display device of a stationary (or desk-top) information processing apparatus have started.

FIG. 10 shows an example of a projection liquid crystal display apparatus. Referring to FIG. 10, light emitted from a high-intensity metal halide lamp 61 is passed through a filter 61a, changed in optical path by a mirror 62, and then partially reflected by a dichroic mirror 63. The light reflected by the mirror 63 is again reflected by a mirror 64, and passed through a condenser lens 65 and a liquid crystal display panel 66. The light outputted from the liquid crystal display panel 66 passes through dichroic mirrors 67 and 68, and reaches a projection lens 69.

On the other hand, part of the light passed through the dichroic mirror 63 is reflected by a dichroic mirror 70, passed through a condenser lens 71 and a liquid crystal panel 72, and then reflected by the dichroic mirror 67. The light reflected by the mirror 67 reaches the projection lens 69 through the dichroic mirror 68.

The light passed through the dichroic mirror 70 is passed through a condenser lens 73 and a liquid crystal display panel 74, then reflected by a mirror 75 and the dichroic mirror 68, and finally projected by the projection lens 69.

Among several types of liquid crystal display devices, the active matrix liquid crystal display device, in which an individual pixel is driven by a thin-film transistor (TFT), is suitable for attaining the above-mentioned high-resolution color display. The active matrix driving method can eliminate crosstalk between pixels which may occur in the passive matrix driving method, and hence can provide superior display performance. In the active matrix driving method, TFTs are arranged on one of the glass substrates that constitute a liquid crystal panel and each TFT controls a voltage applied to a corresponding, transparent pixel electrode.

In the active matrix liquid crystal display device, portions of the liquid crystal layer existing over the pixel electrodes receive drive electric fields generated by means of the TFTs and hence serve for on/off-control of light transmission. However, portions of the liquid crystal layer right above the TFTs are not given any drive electric fields, projection light, back light, or the like may leak through those portions. To improve the display contrast ratio, it is necessary to minimize the light that leaks through the portions where the TFTs are formed. To this end, conventionally, light-interrupting patterns are formed on the substrate that is opposed to the TFT-bearing substrate in the portions where the TFTs are formed. However, in this configuration, precise alignment is needed between the two substrate so that the light-interrupting patterns cover the corresponding TFTs, as a result of which the liquid crystal panel assembling step takes a long time. If wider light-interrupting patterns are formed to facilitate the alignment operation, there arise such problems as a decrease in display brightness.

To solve the above problems, the present inventors investigated a configuration in which light-interrupting patterns are formed on the TFT-bearing substrate, and produced experimental models of such a liquid crystal display device.

FIG. 11 is a plan view of a liquid crystal display panel experimentally produced by the inventors. Referring to FIG. 11, a plurality of generally U-shaped polysilicon patterns 1 are formed corresponding to respective pixels of the liquid crystal display device on one of the two glass substrates opposed to each other to constitute a liquid crystal panel. Connection pads 1a and 1b are formed at both ends of each polysilicon pattern 1. A plurality of aluminum gate bus patterns 2 are formed parallel with each other on the same glass substrate so as to cross over the polysilicon patterns 1 through a $SiO_2$ film serving as a gate insulating film. In each polysilicon pattern 1, the portions on both sides of the portions where the polysilicon pattern 1 crosses the gate bus pattern 2 are doped with an n-type or p-type impurity, so that channel regions of TFTs are formed corresponding to the crossing points of the polysilicon pattern 1 and the gate bus pattern 2. For each U-shaped polysilicon pattern 1, a pair of n-channel or p-channel TFTs are formed so as to be connected to each other in series.

Further, a plurality of aluminum data bus patterns 3 are formed parallel with each other in the vertical direction as viewed in FIG. 11 on the polysilicon patterns 1 so as to correspond to the respective connection pads 1b. Each data bus pattern 3 is connected to the corresponding connection pad 1b via a contact hole, and drive current is supplied via the connection pad 1b to a p-type or n-type drain region that is formed in the polysilicon pattern 1. On the other hand, the connection pad 1a is connected to a transparent pixel electrode through a light-interrupting pattern or an aluminum pattern (described below).

In the above configuration, a light-interrupting mask 5 is formed corresponding to the gate bus patterns 2 and the data bus patterns 3. The light-interrupting mask 5, which is made of an opaque metal such as Ti, interrupts light that leaks through openings between adjacent pixel electrodes.

FIG. 12 is a sectional view taken along line Z–Z' in FIG. 11. Referring to FIG. 12, the polysilicon pattern 1 is formed on a glass substrate 10 and covered with a first-layer insulating film 6. The data bus pattern 3 is formed on the insulating film 6, and connected to the connection pad 1b of the polysilicon pattern 1 via a contact hole 6a that is formed through the insulating film 6.

The data bus pattern 3 is covered with a second-layer insulating film 7, and the light-interrupting mask 5 is formed on the insulating film 7 so as to correspond to the data bus pattern 3. The light-interrupting mask 5 is covered with a third-layer insulating film 8, and an ITO pattern 9 as a transparent electrode is formed on the insulating film 8. The transparent electrode pattern 9 is connected to the connection pad 1a of the polysilicon pattern 1 via another contact hole (not shown).

Although not shown in the sectional view of FIG. 12, the gate bus pattern 2 is formed on the substrate 10 in the same level as the polysilicon pattern 1, and crosses over the polysilicon pattern 1 at the channel regions of the TFTs.

In FIG. 11, the data bus pattern 3 is drawn so as to be shifter leftward from the polysilicon pattern 1. This simply indicates that the data bus pattern 3 is formed on the polysilicon pattern 1 as shown in FIG. 12.

In the above configuration, the portions of the light-interrupting mask 5 extending in the vertical direction as viewed in FIG. 11 (i.e., in the column direction) interrupt light that leaks out passing by both side edges of the data bus pattern 3 which extends in the vertical direction. Since the data bus pattern 3 possibly interacts with the transparent electrode pattern 9 via a capacitance, it cannot be made so wide as to overlap the electrode pattern 9; a gap g should necessarily be formed in between. The light interrupting mask 5 interrupts light that leaks through the gap g.

In the configuration of FIGS. 11 and 12, the light-interrupting mask 5 can be formed on the substrate 10 on which the TFTs are formed, by part of a series of steps for forming the TFTs. Therefore, substantially ideal alignment can be attained between the light-interrupting mask 5 and the TFTs, whereby the conventional step of accurately aligning the substrate 10 with the opposed substrate on which a light-interrupting pattern is formed can be omitted.

However, when a liquid crystal display device having the configuration of FIGS. 11 and 12 was actually produced, a problem was found that the metal pattern as the light-interrupting mask 5 was likely short-circuited with the data bus pattern 3, making it difficult to increase the yield of the liquid crystal display device.

This is considered due to a phenomenon that insufficient step coverage of the insulating film 7 with respect to the data bus pattern 3 causes short-circuiting between the light-interrupting mask 5 and the data bus pattern 3, as illustrated in FIG. 13. Similar short-circuiting likely occurs between the light-interrupting film 5 and the transparent electrode pattern 9. Since the light-interrupting mask 5 is a continuous member extending vertically and horizontally as shown in FIG. 11, such short-circuiting causes a line defect.

SUMMARY OF THE INVENTION

A general object of the present invention is to provide a novel, useful liquid crystal electro-optical (display) device that is free of the above-described problems.

A specific object of the invention is to provide a liquid crystal electro-optical (display) device in which a light-interrupting mask can be aligned easily and which is high in both reliability and yield.

To attain the above objects, according to the invention, there is provided a liquid crystal electro-optical (display) device comprising a pair of substrates opposed to each other to constitute a liquid crystal panel; a plurality of thin-film transistors arranged in matrix form on one of the pair of substrates so as to correspond to a plurality of pixels, respectively; a plurality of light-interrupting stripes continuously extending parallel with each other in a row direction so as to cover the thin-film transistors arranged in the row direction; and light-interrupting patterns formed corresponding to the respective pixels so as to be isolated from each other and from the light-interrupting stripes.

The light-interrupting pattern may include, for each of the pixels, first and second patterns isolated from each other, the first isolated pattern covering one edge of an associated one of light-interrupting patterns extending in a column direction which constitute data bus patterns for the thin-film transistors, the second isolated pattern covering the other edge of the light-interrupting pattern.

The liquid crystal display device may further comprise a plurality of light-interrupting patterns extending in the row direction which constitute gate bus patterns for the thin-film transistors, each of the gate bus patterns having branches provided corresponding to the respective data bus patterns so as to extend downward in the column direction.

The light-interrupting stripes may be formed so as to cover the respective gate bus patterns, and a tip of each of the branches may be located outside a side edge of the associated light-interrupting stripe.

Each of the light-interrupting stripes may have branches extending in the column direction so as to cover the respective data bus patterns.

According to another aspect of the invention, there is provided a liquid crystal electro-optical (display) device comprising a pair of substrates opposed to each other to constitute a liquid crystal panel; a plurality of thin-film transistors arranged in matrix form on one of the pair of substrates so as to correspond to a plurality of pixels, respectively; a plurality of light-interrupting stripes formed on one of the substrates carrying the thin film transistors and continuously extending parallel with each other in a column direction so as to cover the thin-film transistors arranged in the column direction; and light-interrupting patterns formed corresponding to the respective pixels so as to be isolated from each other and from the light-interrupting stripes.

The light-interrupting pattern may include, for each of the pixels, first and second patterns isolated from each other, the first isolated pattern covering one edge of an associated one of light-interrupting patterns extending in a row direction which constitute gate bus patterns for the thin-film transistors, the second isolated pattern covering the other edge of the light-interrupting pattern.

According to a further aspect of the invention, there is provided a liquid crystal electro-optical (display) device comprising a pair of substrates opposed to each other to constitute a liquid crystal panel; a plurality of thin-film transistors arranged in matrix form on one of the pair of substrates so as to correspond to a plurality of pixels, respectively; and a plurality of light-interrupting stripes continuously extending parallel with each other in a row direction so as to cover the thin-film transistors arranged in the column direction, each of the plurality of light-interrupting stripes having branches extending in a row direction so as to cover respective gate bus patterns for the thin-film transistors extending in the row direction, one of the branches of each of the light-interrupting stripes being opposed to the corresponding branch of the adjacent one of the light-interrupting stripes above a semiconductor pattern as an active portion of the associated thin-film transistor to form a gap narrower than a width of the semiconductor pattern.

In each of the above liquid crystal electro-optical (display) devices, the plurality of light-interrupting stripes may be connected to a common potential.

The principle of the present invention will be described below with reference to FIGS. 1, 3 and 4. FIG. 1 is a plan view showing a basic layout of a liquid crystal electro-optical (display) device according to the invention, and FIGS. 3 and 4 are sectional views taken along lines A–A' and B–B' in FIG. 1, respectively.

Referring to FIG. 1, in the invention, a plurality of light-interrupting stripes 5' are formed so as to extend in the row direction instead of the light-interrupting mask 5 shown in FIG. 11. Further, branches 2A are formed so as to extend from a gate bus pattern 2 in the column direction as light-interrupting patterns for data bus patterns 3 extending in the column direction. Each branch 2A does not reach the adjacent polysilicon pattern 1 and a gap is formed with a connection pad 1b of the polysilicon pattern 1. Therefore, the gate bus pattern 2 and the polysilicon pattern 1 never contact with each other electrically via the branch 2A.

In the invention, to prevent leakage of light through the above-mentioned gap, first and second light-interrupting patterns 5A and 5B are formed so as to be isolated from the light-interrupting stripe 5'. Made of an opaque metal as in the case of the light-interrupting stripe 5', the light-interrupting pattern 5A prevents light leakage through the gap between the left side edge of the data bus pattern 3 and a transparent electrode pattern 9. Similarly, the light-interrupting pattern 5B prevents light leakage through the gap between the right side edge of the data bus pattern 3 and an adjacent transparent electrode pattern 9 on the right.

In the above configuration, should the light-interrupting pattern 5A or 5B short-circuit with the data bus pattern 3, the short-circuiting does not affect display because the light-interrupting patterns 5A and 5B are isolated. Therefore, the invention provides a liquid crystal electro-optical (display) device which can attain high-contrast display with sufficient light interruption without causing a line defect.

DETAILED DESCRIPTION OF THE PREFERRED EMBODIMENTS

Figure 2:
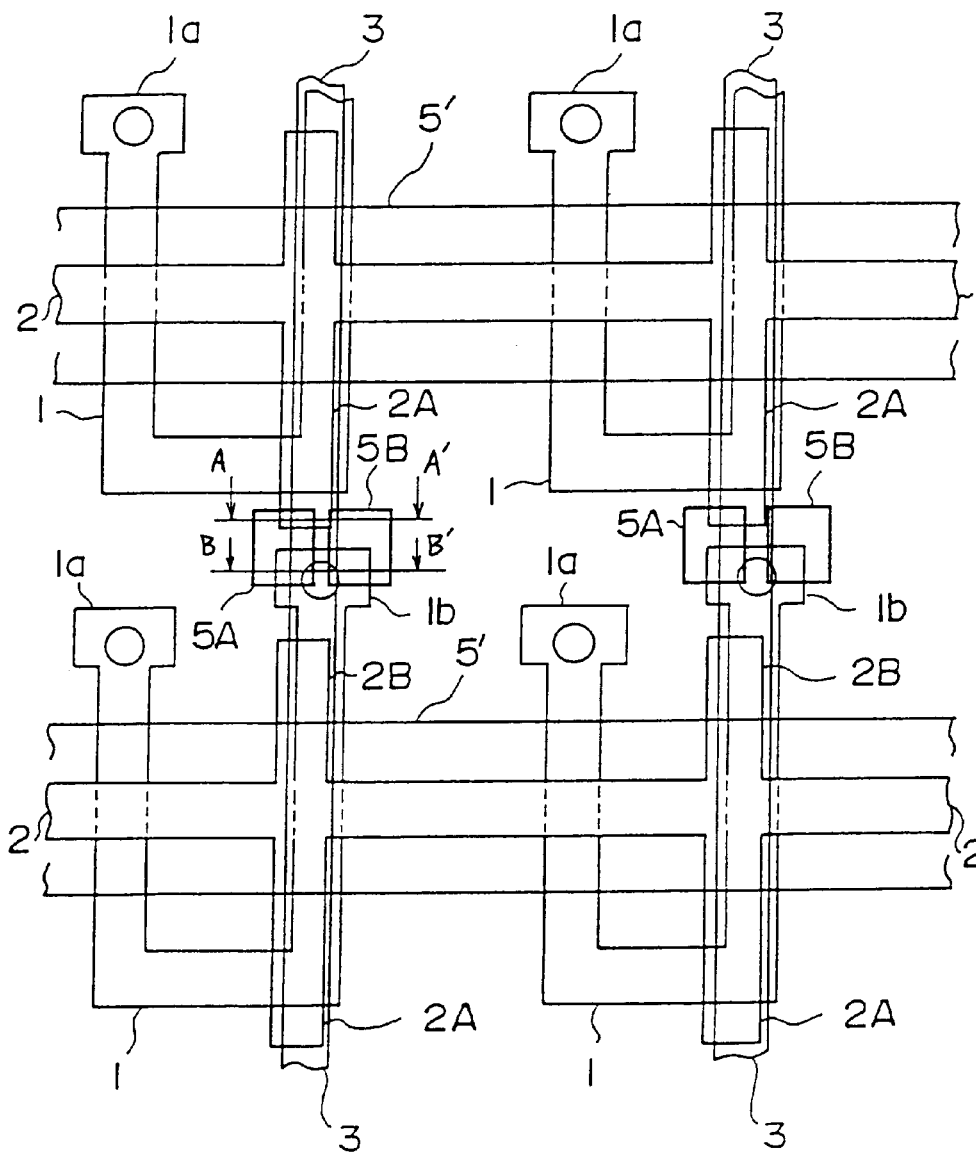
FIG. 2 is a plan view showing the main part of a liquid crystal electro-optical (display) device according to a first embodiment of the invention.

FIG. 2 is a plan view showing the layout of a TFT substrate that is used in a liquid crystal display device according to a first embodiment of the present invention. The parts in FIG. 2 already described above are given the same reference numerals and descriptions therefor will be omitted.

Referring to FIG. 2, the gate bus pattern 2 has another set of branches 2B that are opposite the branches 2A and extend along the data bus pattern 3. The tip of each branch 2B is located outside the light-interrupting stripe 5'.

Figure 1:
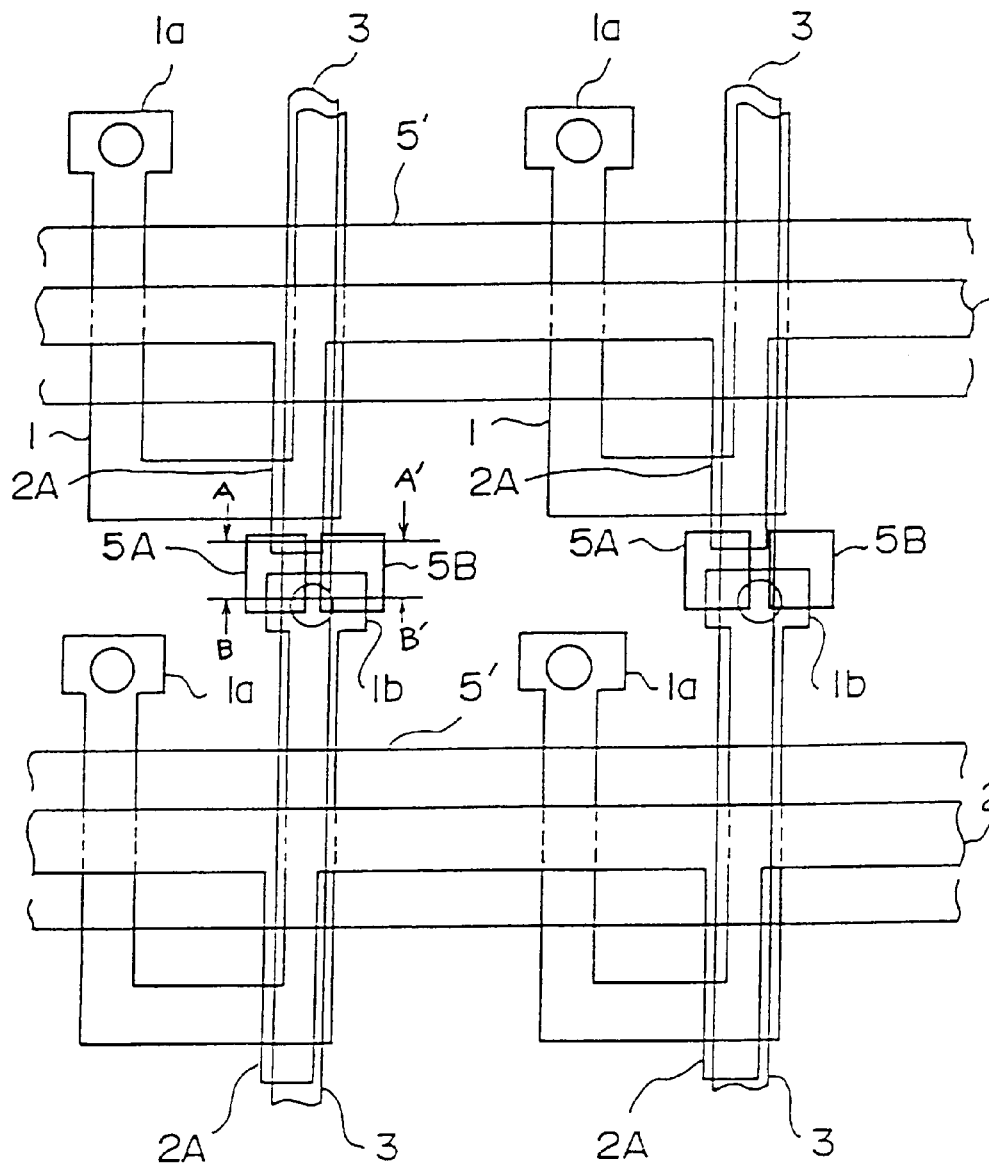
FIG. 1 is a plan view showing the principle of the present invention.
Figure 3:
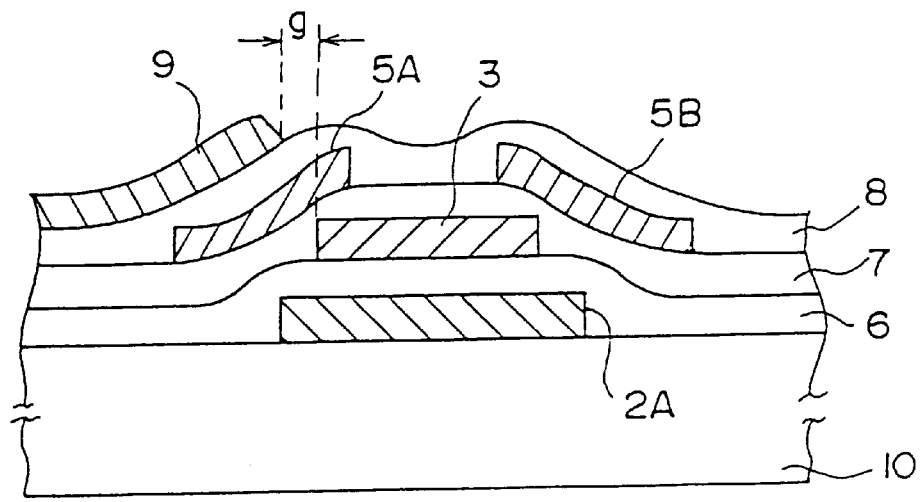
FIG. 3 is a sectional view taken along line A–A' in FIG. 1 or 2.

FIG. 3 is a sectional view taken along line A–A' in FIG. 2 (or FIG. 1). Referring to FIG. 3, the branch 2A extending from the gate bus pattern 2 is formed on a glass substrate 10 in the same level as the polysilicon pattern 1 as the active portion of the TFTs. The data bus pattern 3 extends over the pattern 2A through a first-layer insulating film 6. The data bus pattern 3 is covered with a second-layer insulating film 7. The light-interrupting patterns 5A and 5B are formed on the insulating film 7 separately from each other so as to correspond to both side edges of the pattern 3. The patterns 5A and 5B are covered with a third-layer insulating film 8, and an ITO pattern 9 is formed on the insulating film 8.

Figure 4:
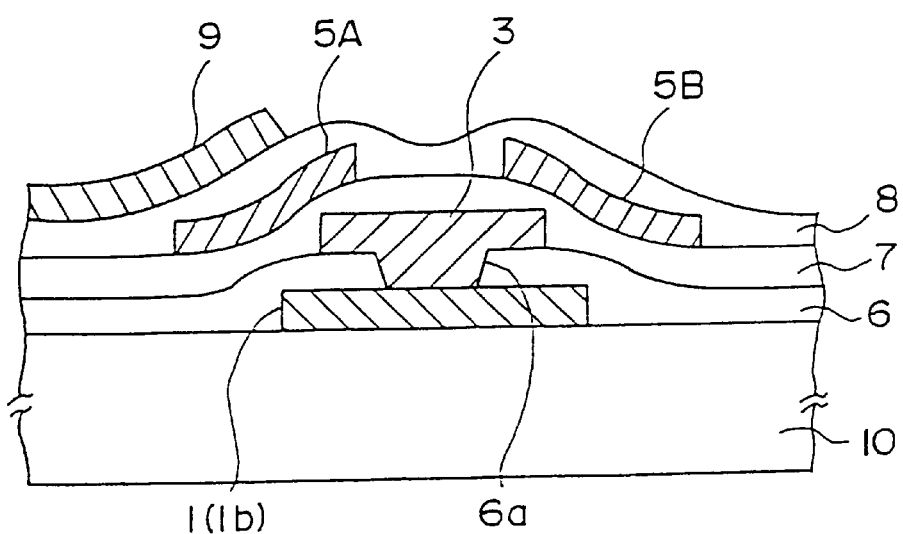
FIG. 4 is a sectional view taken along line B–B' in FIG. 1 or 2.

FIG. 4 is a sectional view taken along line B–B' in FIG. 2 (or FIG. 1). Referring to FIG. 4, the connection pad 1b of the polysilicon pattern 1 as the active portion of the TFTs is formed on the glass substrate 10. The data bus pattern 3 extends over the pattern 1 through the first-layer insulating film 6. The data bus pattern 3 is connected to the connection pad 1b via a contact hole 6a that is formed through the insulating film 6. As described above, the connection pad 1b is connected to a drain region of the TFT.

The data bus pattern 3 is covered with the second insulating film 7. The light-interrupting patterns 5A and 5B are formed on the insulating film 7 separately from each other so as to correspond to both side edges of the pattern 3. The light-interrupting patterns 5A and 5B are covered with the third insulating film 8, and the ITO transparent electrode pattern 9 is formed on the insulating film 8.

As seen from FIG. 3, in the configuration of FIG. 2, the branch 2A of the gate bus pattern 2 which extends along the data bus pattern 3 prevents light leakage through the gap g between the transparent electrode pattern 9 and pattern 3. In the region where the branch 2A no longer exists, the isolated light-interrupting patterns 5A and 5B prevents such light leakage. The similar light leakage preventing effect is obtained by the other branch 2B of the gate bus pattern 2.

Since the isolated light-interrupting patterns 5A and 5B are separated from each other, there are no such problems as a line defect occurring in display of the liquid crystal display device even if one of the light-interrupting patterns 5A and 5B short-circuits with the data bus pattern 3 or the transparent electrode pattern 9.

Further, in the configuration of FIG. 2, since the tip of the branch 2B is located outside the light-interrupting stripe 5', even if the data bus pattern 3 has a sharp step in a front edge portion of the branch 2B, the sharp step does not cause short-circuiting between the light-interrupting stripe 5' and the data bus pattern 3.

Next, a second embodiment of the invention will be described with reference to FIG. 5. The parts in FIG. 5 which have already been described above are given the same reference numerals and descriptions therefor will be omitted.

In this embodiment, the branches 2B in the second embodiment are omitted and instead branches 5C and 5D extends from each light-interrupting stripe 5' in the column direction so as to correspond to the data bus patterns 3. The branch 5C extends above the branch 2A of the gate bus pattern 2, and prevents leakage of light passing by the side edges of the data bus pattern 3. On the other hand, on the side opposite the branch 5C, the branch 5D extends along the data bus pattern 3 toward the isolated light-interrupting patterns 5A and 5B, and prevents leakage of light passing by the side edges of the data bus pattern 3.

Next, a third embodiment of the invention will be described with reference to FIG. 6. The parts in FIG. 6 which have already been described above are given the same reference numerals and descriptions therefor will be omitted.

In this embodiment, light-interrupting stripes 5" extending in the column direction are used instead of the light-interrupting stripes 5' extending in the row direction. That is, the light-interrupting stripes 5" extend in the column direction so as to cover the respective data bus patterns 3. The gate bus patterns 2 extending in the row direction are widened at the intersections with the data bus lines 3. Further, a pair of isolated light-interrupting patterns 5A" and 5B" extending in the row direction are formed corresponding to the narrow portions of each gate bus pattern 2 so as to cover the side edges of the gate bus pattern 2, to thereby prevent leakage of light passing by those side edges.

Figure 7:
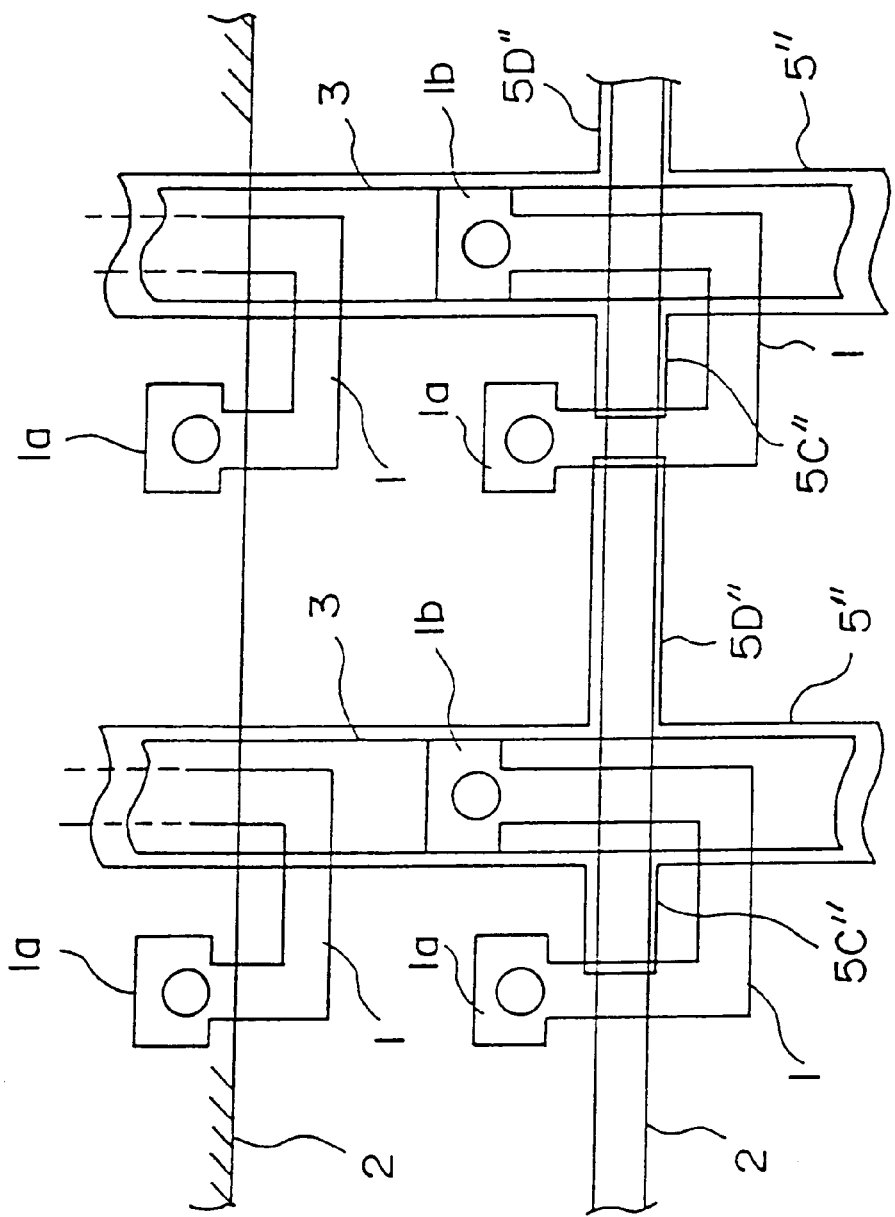
FIG. 7 is a plan view showing the main part of a liquid crystal electro-optical (display) device according to a fourth embodiment of the invention.

FIG. 7 shows the main part of a liquid crystal display device according to a fourth embodiment of the invention.

Figure 6:
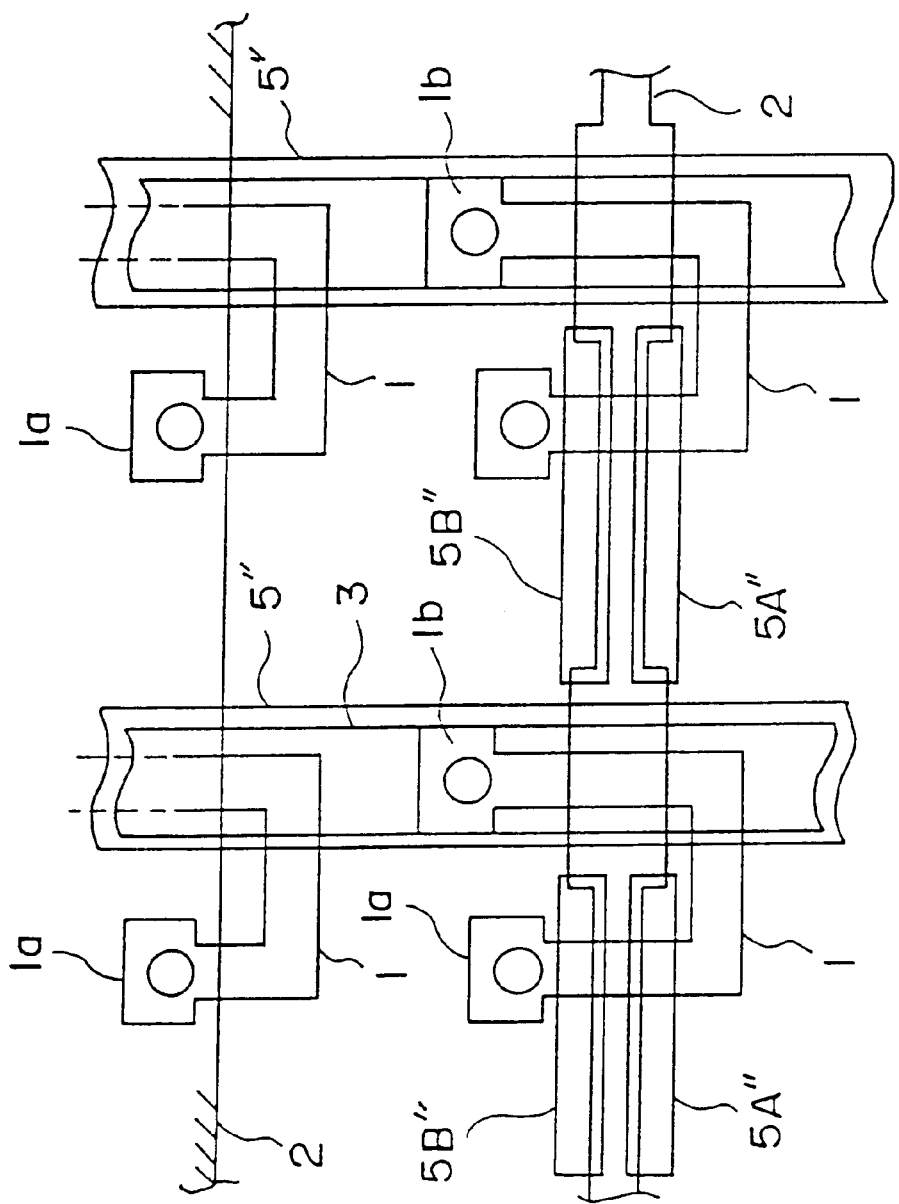
FIG. 6 is a plan view showing the main part of a liquid crystal electro-optical (display) device according to a third embodiment of the invention.

Referring to FIG. 7, in this embodiment, as in the case of the embodiment of FIG. 6, the light-interrupting stripes 5" are formed so as to extend in the column direction along the respective data bus patterns 3. Each light-interrupting stripe 5" has branches 5C" and 5D" extending in the row direction so as to cover the gate bus pattern 2. As for a pair of light-interrupting stripes 5" adjacent to each other, the branch 5D" extending rightward (as viewed in FIG. 7) from one interrupting stripe 5" is opposed to the branch 5C" extending leftward from the other light-interrupting stripe 5" above the polysilicon pattern 1 as the active portion of the TFTs. The interval between the branches 5C" and 5D" is set narrower than the width of the polysilicon pattern 1, whereby leakage of light passing by both side edges of the polysilicon pattern 1 is prevented by the branches 5C" and the 5D". That is, in this embodiment, the polysilicon pattern 1 itself is used for light interruption.

Figure 8:
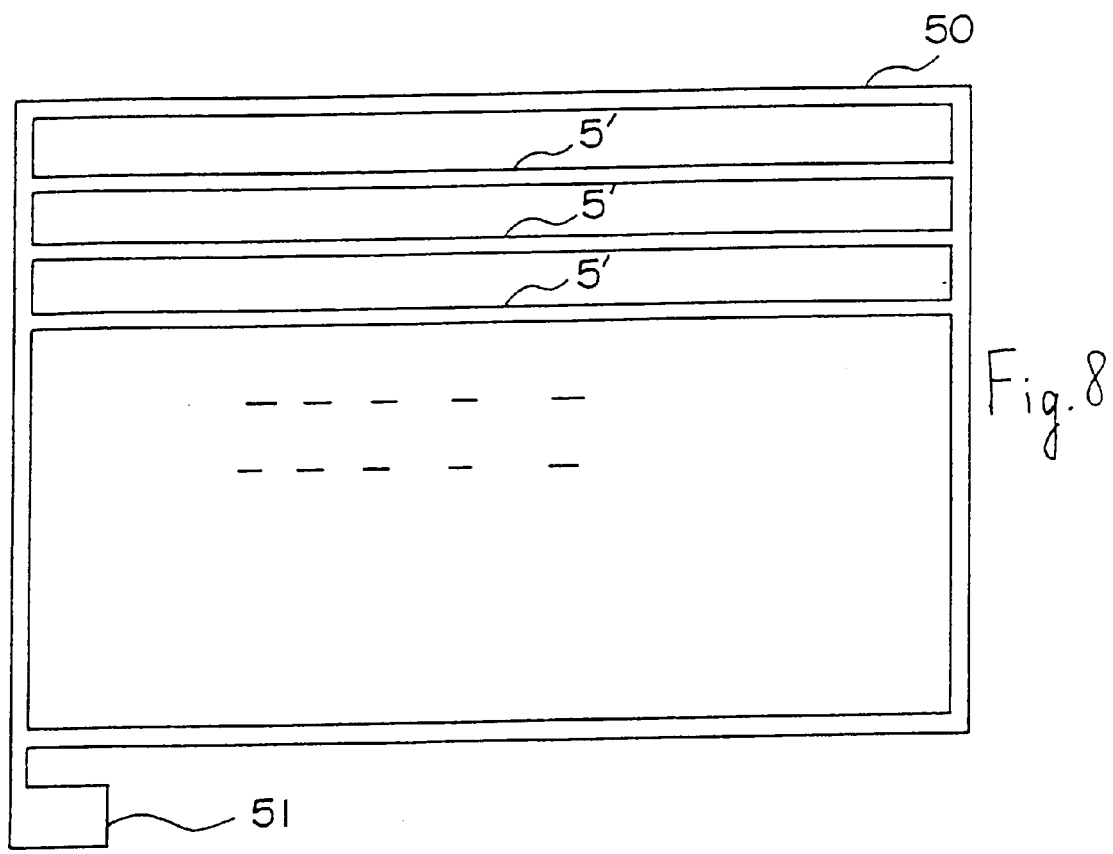
FIG. 8 shows the entire configuration of the liquid crystal electro-optical (display) devices according to the invention.

FIG. 8 shows the entire configuration of the substrate on which the TFTs are formed in the liquid crystal display devices according to the first to fourth embodiments of the invention. In FIG. 8, only the light-interrupting stripes 5' are shown and the TFTs and the transparent electrode patterns are omitted.

Referring to FIG. 8, a number of light-interrupting stripes 5' extend parallel with each other on the substrate, and each light-interrupting stripe 5' is connected to a light-interrupting pattern 50 that surrounds the pixel area of the display device. The light-interrupting pattern 50 is formed with a connection pad 51. The light-interrupting stripes 5' are given a common potential, for instance, the grounding potential, via the light-interrupting pattern 50 and the connection pad 51.

Figure 5:
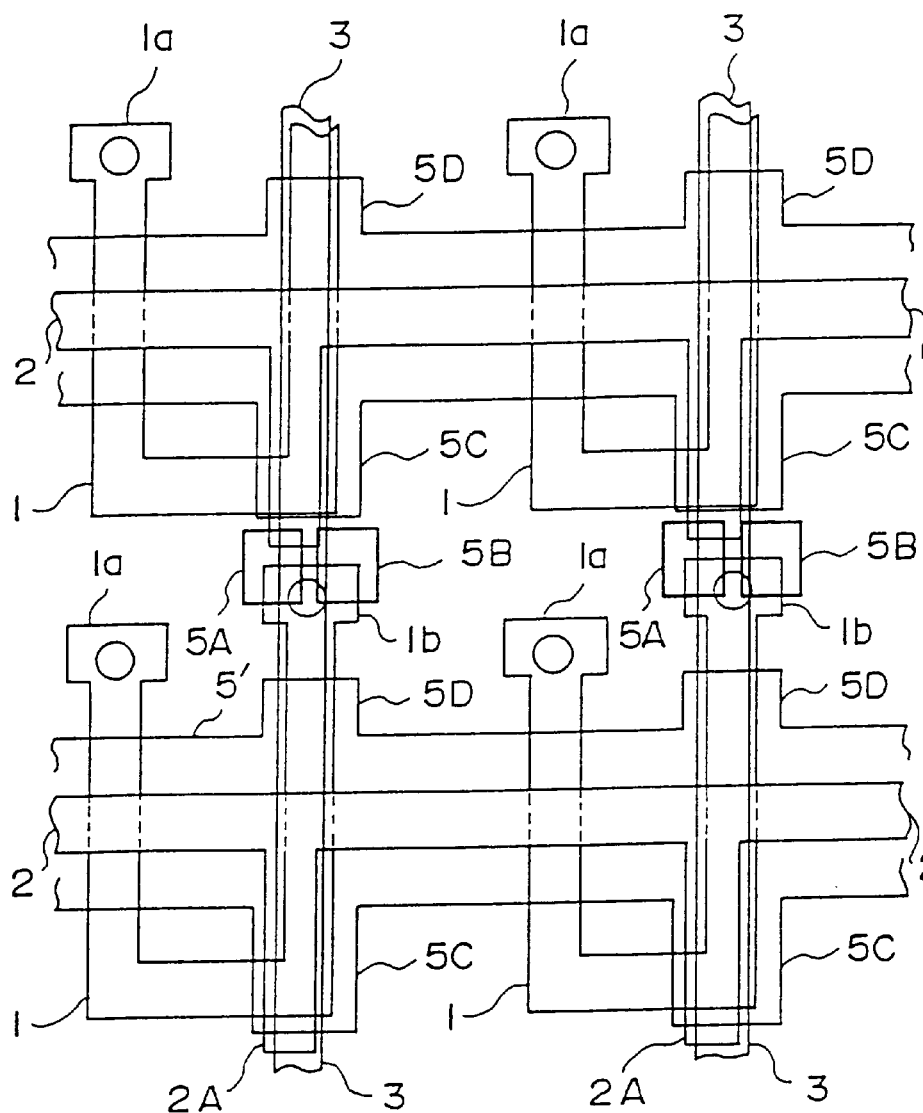
FIG. 5 is a plan view showing the main part of a liquid crystal electro-optical (display) device according to a second embodiment of the invention.
Figure 9:
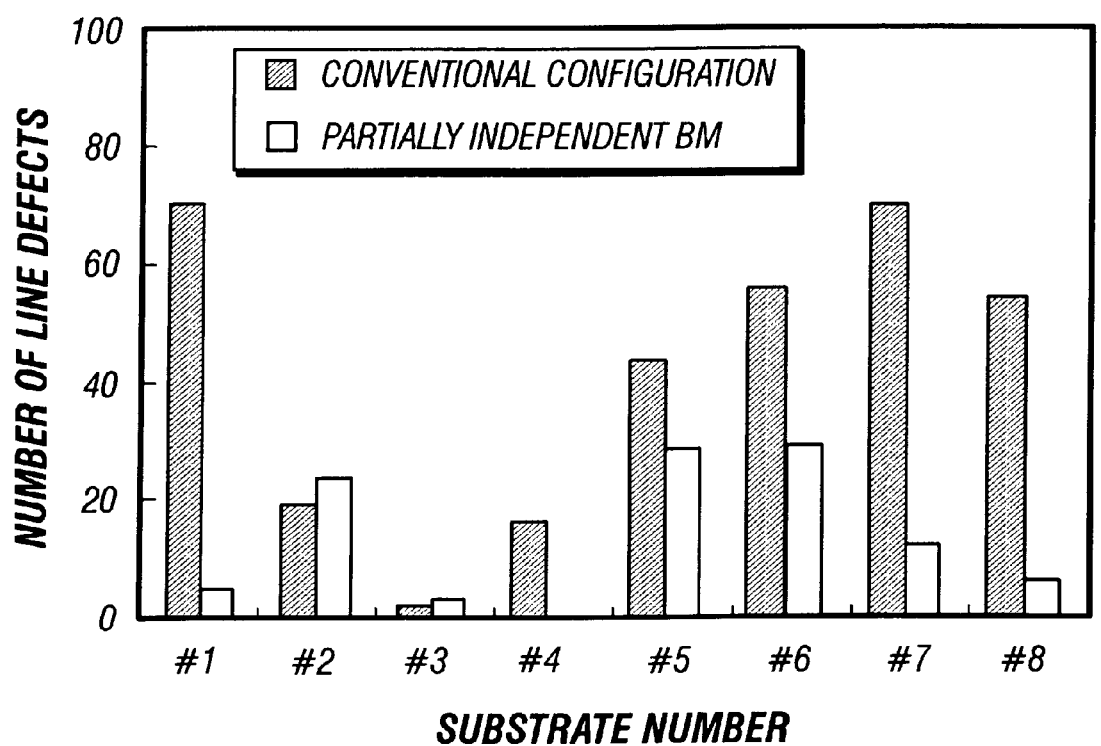
FIG. 9 is a graph showing an advantage of the invention.
Figure 10:
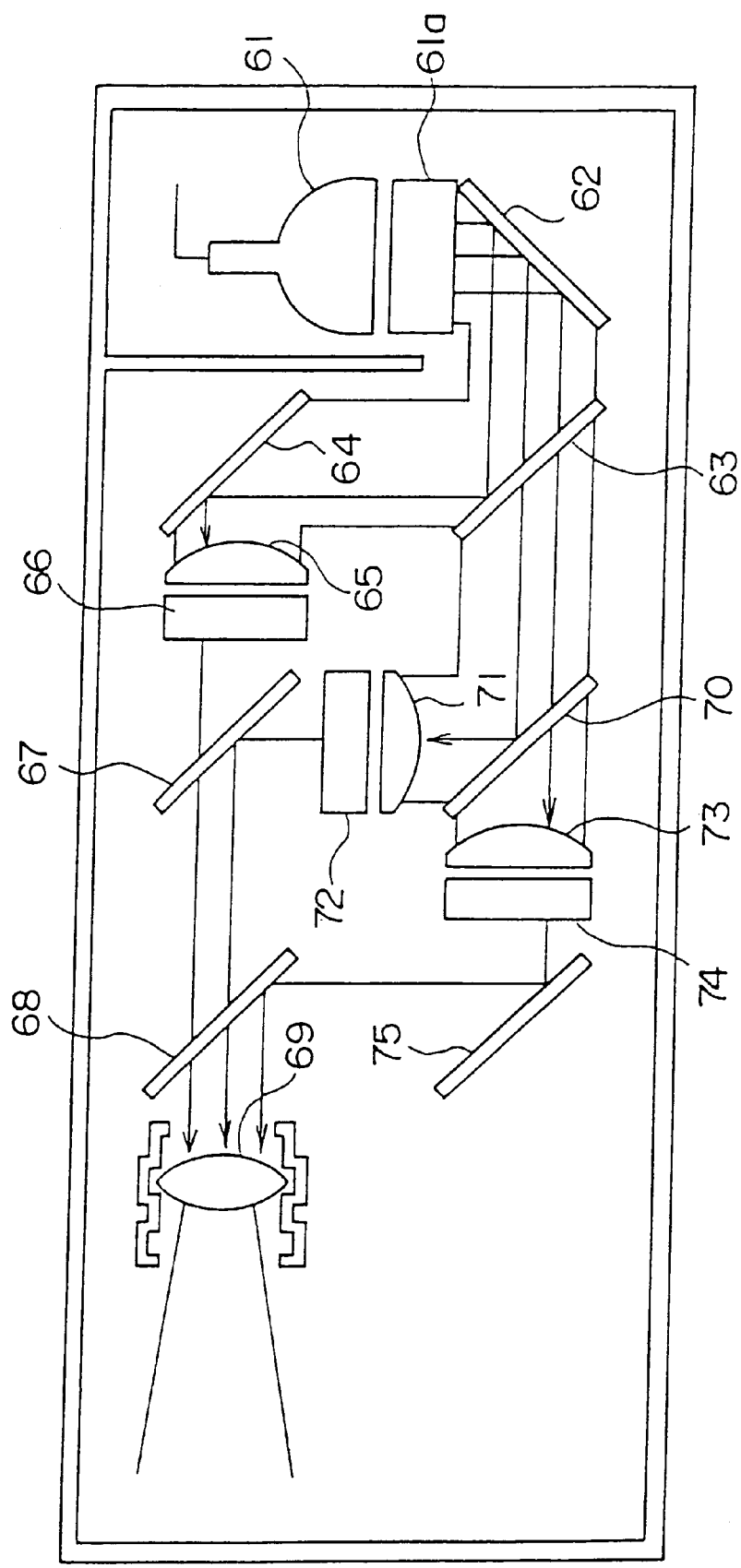
FIG. 10 shows an example configuration of a projection liquid crystal electro-optical (display) device.
Figure 11:
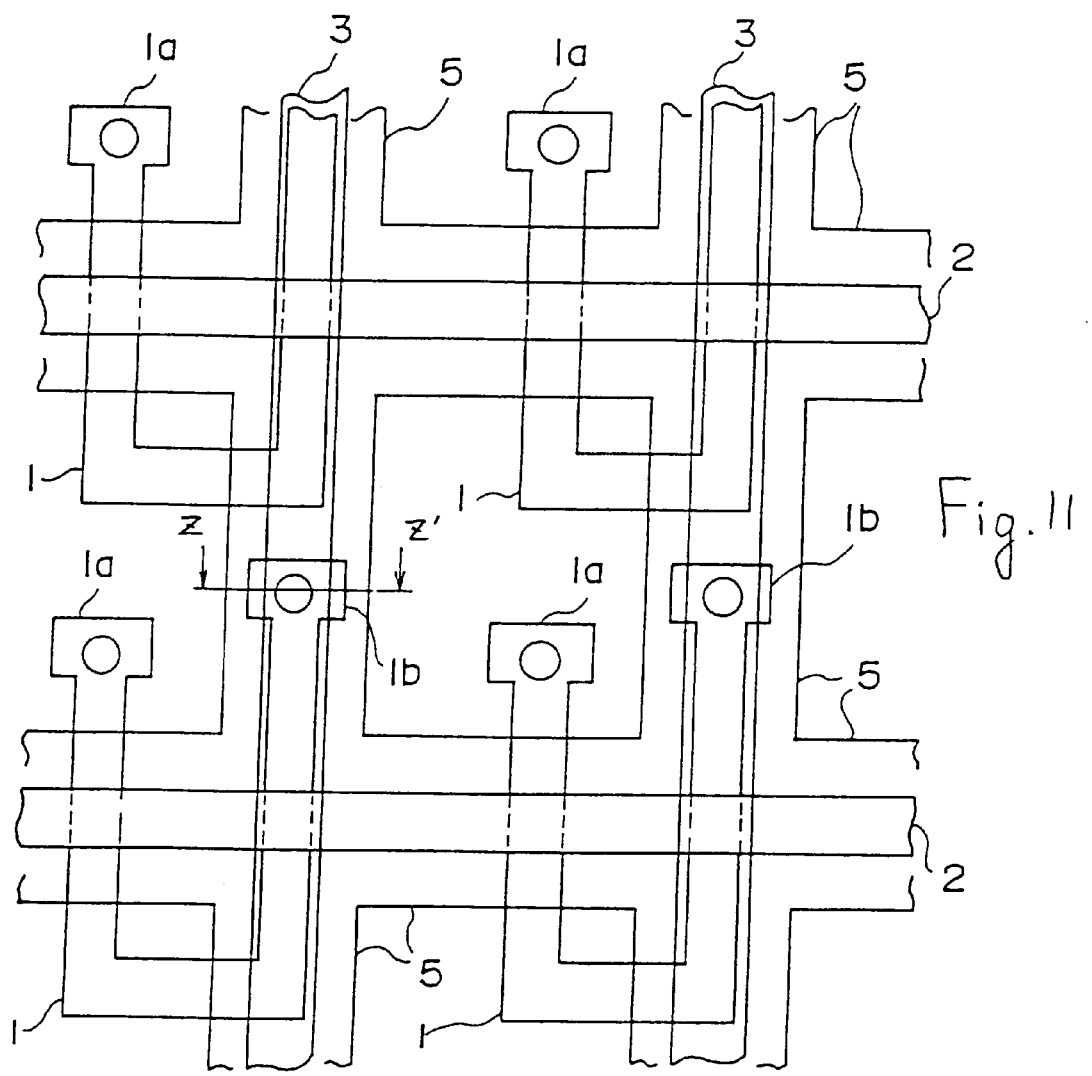
FIG. 11 shows the configuration of part of an experimental liquid crystal display device.
Figure 12:
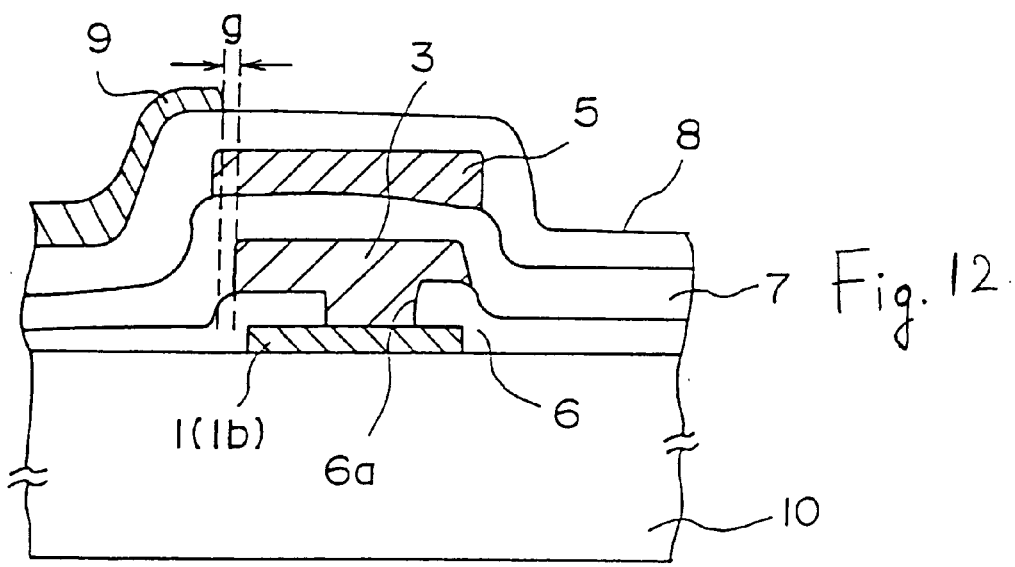
FIG. 12 is a sectional view taken along line Z–Z' in FIG. 11.
Figure 13:
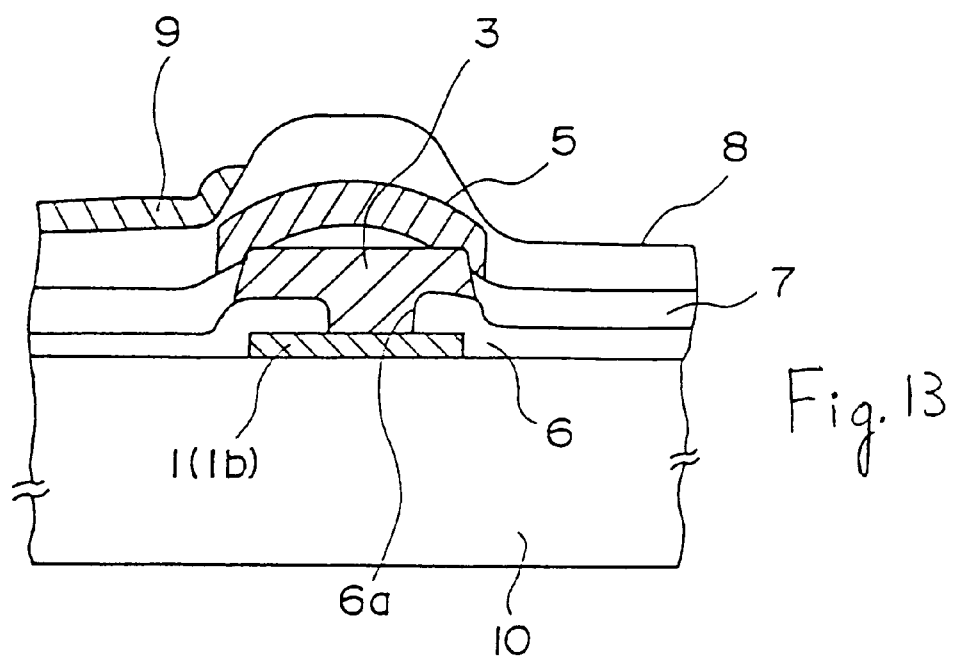
FIG. 13 illustrates a problem that is associated with the configuration of FIG. 11.

FIG. 9 shows results of an experiment in which samples #1 to #8 of liquid crystal display devices were produced for each of the conventional configuration of FIG. 11 and the configurations of the invention of FIGS. 1, 2, and 5 and line defect densities of those samples were evaluated.

As seen from FIG. 9, the number of line defects is much larger in the conventional substrates (hatched bars) than in the substrates of the invention (blank bars). Thus, the invention can solve the problem of line defects that occur in the conventional configuration.

Although the preferred embodiments of the invention were described above, the invention is in no way limited to such particular embodiments and various changes and modifications are possible without departing from the spirit and scope of the invention.

According to one aspect of the invention, in a liquid crystal display device in which a number of thin-film transistors are arranged in matrix form on one of a pair of substrates constituting a liquid crystal panel so as to correspond to respective pixels, a number of light-interrupting stripes continuously extend parallel with each other in the row or column direction so as to cover the thin-film transistors arranged in the row or column direction. Further, light-interrupting patterns are formed corresponding to the respective pixels so as to be isolated from each other and from the light-interrupting stripes. As a result, a highly reliable liquid crystal display device can be obtained which provides high contrast without light leakage and in which line defects hardly occur. Since the light-interrupting patterns are formed on the substrate on which the thin-film transistors are formed, the step for aligning the two substrates can be simplified, whereby the throughput of assembling the liquid crystal display device can be greatly improved and the manufacturing cost can be reduced.

According to another aspect of the invention, each of a number of light-interrupting stripes extending in the column direction has branches extending in the row direction so as to cover respective gate bus patterns for the thin-film transistors extending in the row direction. Each branch is opposed to the corresponding branch of the adjacent light-interrupting stripe above a polysilicon pattern as an active portion of the associated thin-film transistor to form a gap narrower than a width of the semiconductor pattern. Thus, a light-interrupting system can be obtained which is simple and effective, and hardly causes short-circuiting.

Further, by connecting the light-interrupting stripes to a common potential, for instance, the grounding potential, the individual thin-film transistors are allowed to operate stably.

What is claimed is:

1. A liquid crystal electro-optical device comprising:
    a pair of substrates opposed to each other to constitute a liquid crystal panel;
    a plurality of thin-film transistors arranged in matrix form over one of the pair of substrates so as to correspond to a plurality of pixels, respectively, said thin film transistors having respective semiconductor patterns;
    a plurality of data bus lines provided over said one of the pair of substrates and extending along columns of said matrix form, respectively, each of said data bus lines being connected with the corresponding thin-film transistors arranged on corresponding one of columns of said matrix form;
    a plurality of gate bus lines provided over said one of the pair of substrates and extending along rows of said matrix form, respectively, each of said gate bus lines overlapping with the semiconductor patterns of corresponding thin-film transistors which are arranged in the corresponding row;
    a plurality of light-interrupting stripes each covering the corresponding one of said gate bus lines; and
    light-interrupting patterns formed corresponding to the respective pixels so as to be isolated from each other, each of said light-interrupting patterns being isolated from corresponding one of the light-interrupting stripes, each of said light-interrupting patterns overlapping with corresponding ones of said data bus lines.

2. A device according to claim 1, wherein the light-interrupting pattern includes, for each of the pixels, first and second patterns isolated from each other, the first isolated pattern covering one edge of an associated one of said data bus lines, the second isolated pattern covering the other edge of the associated one of said data bus lines.

3. A device according to claim 2, further comprising a plurality of light-interrupting patterns extending in the row direction which constitute gate bus patterns for the thin-film transistors, each of the gate bus patterns having branches provided corresponding to the respective data bus patterns so as to extend downward in the column direction.

4. A device according to claim 3, wherein the light-interrupting stripes are formed so as to cover the respective gate bus patterns, and wherein a tip of each of the branches is located outside a side edge of the associated light-interrupting stripe.

5. A device according to claim 2, wherein each of the light-interrupting stripes has branches extending in the column direction so as to cover the respective data bus patterns.

6. A device according to claim 1, wherein the plurality of light-interrupting stripes are connected to a common potential.

7. A liquid crystal electro-optical device comprising:
a pair of substrates opposed to each other to constitute a liquid crystal panel;
a plurality of thin-film transistors arranged in matrix form over one of the pair of substrates so as to correspond to a plurality of pixels, respectively, said thin-film transistors having respective semiconductor patterns;
a plurality of data bus lines provided over said one of the pair of substrates and extending along rows of said matrix form, respectively, each of said data bus lines being connected with the corresponding thin-film transistors arranged on corresponding one of said rows;
a plurality of gate bus lines provided over said one of the pair of substrates and extending along columns of said matrix form, respectively, each of said gate bus lines overlapping with the semiconductor patterns of the corresponding thin-film transistors which are arranged in the corresponding column;
a plurality of light-interrupting stripes each covering the corresponding one of said gate bus lines; and
light interrupting patterns formed corresponding to the respective pixels so as to be isolated from each other, each of said light-interrupting patterns being isolated from corresponding one of the light-interrupting stripes, each of said light-interrupting patterns overlapping with corresponding one of said data bus lines.

8. A device according to claim 7, wherein the light-interrupting pattern includes, for each of the pixels, first and second patterns isolated from each other, the first isolated pattern covering one edge of an associated one of said gate bus lines, the second isolated pattern covering the other edge of the associated one of said gate bus lines.

9. A device according to claim 8, wherein the plurality of light-interrupting stripes are connected to a common potential.

10. A liquid crystal electro-optical device comprising:
a pair of substrates opposed to each other to constitute a liquid crystal panel;
a plurality of thin-film transistors arranged in matrix form over one of the pair of substrates so as to correspond to a plurality of pixels, respectively;
a plurality of data bus lines provided over said one of the pair of substrates and extending along columns of said matrix form, each of said data bus lines being connected with the corresponding thin-film transistors arranged on corresponding one of said columns;
a plurality of gate bus lines provided over said one of the pair of substrates and extending along rows of said matrix form, each of said gate bus lines overlapping with the corresponding thin-film transistors which are arranged in the corresponding row; and
a plurality of light-interrupting stripes each covering corresponding one of said data bus lines, each of the plurality of light-interrupting stripes having branches extending in a row direction so as to cover respective gate bus lines for the thin-film transistors extending in the row direction, one of the branches of each of the light-interrupting stripes being opposed to the corresponding branch of the adjacent one of the light-interrupting stripes above a semiconductor pattern as an active portion of the associated thin-film transistor to form a gap narrower than a width of the semiconductor pattern.

11. A device according to claim 10, wherein the plurality of light-interrupting stripes are connected to a common potential.

12. An electro-optical device comprising:
a thin-film transistor provided over a substrate and comprising a semiconductor pattern having a source region, a drain region and a channel forming region provided between said source region and said drain region;
a data bus line provided over said substrate;
a gate bus line provided over said substrate and overlapping with said semiconductor pattern;
a pixel electrode provided over said substrate;
two connection pads provided over said substrate;
said data bus line being connected with one of said source region and said drain region through one of said two connection pads;
said pixel electrode being connected with the other of said source region and said drain region through the other of said two connection pads;
a light-interrupting stripe provided over said substrate and apart from said two connection pads and covering said gate bus line; and
a light-interrupting pattern provided over said substrate and covering a side edge of said data bus line and a side edge of said pixel electrode, said light-interrupting pattern being apart from said data bus line through an insulating layer and being isolated from said light-interrupting stripe.

* * * * *